United States Patent
Raj et al.

(10) Patent No.: US 12,077,019 B1
(45) Date of Patent: Sep. 3, 2024

(54) SYSTEMS AND METHODS FOR DETECTING AND REMOVING ERRONEOUS TIRE PRESSURE VALUES

(71) Applicant: Geotab Inc., Oakville (CA)

(72) Inventors: Lourd Arun Raj, St. Laurent (CA); Michael Angelo David Santorelli, Concord (CA); Giordano Aldo Arezza, Maple (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 18/413,179

(22) Filed: Jan. 16, 2024

Related U.S. Application Data

(60) Provisional application No. 63/443,840, filed on Feb. 7, 2023.

(51) Int. Cl.
*B60C 23/04* (2006.01)
*G06F 18/243* (2023.01)

(52) U.S. Cl.
CPC .... *B60C 23/0479* (2013.01); *G06F 18/24323* (2023.01)

(58) Field of Classification Search
CPC ............ B60C 23/0479; G06F 18/24323
USPC ........................................... 340/442
See application file for complete search history.

(56) References Cited

U.S. PATENT DOCUMENTS

| | | | |
|---|---|---|---|
| 11,338,627 B1 | 5/2022 | McGillan | |
| 11,556,509 B1 * | 1/2023 | Sukhov | G06F 16/29 |
| 11,731,469 B1 | 8/2023 | McGillan | |
| 2022/0035778 A1 * | 2/2022 | Sukhov | G06F 7/02 |
| 2022/0176758 A1 | 6/2022 | Degenhardt et al. | |

FOREIGN PATENT DOCUMENTS

| | | | | |
|---|---|---|---|---|
| CN | 107562696 A | * | 1/2018 | |
| CN | 107878467 A | * | 4/2018 | B60W 50/14 |
| CN | 108357307 A | * | 8/2018 | B60C 23/0415 |
| EP | 2777957 A2 | | 9/2014 | |
| WO | WO-2014083625 A1 | * | 6/2014 | B60C 23/04 |

* cited by examiner

*Primary Examiner* — Kam Wan Ma
(74) *Attorney, Agent, or Firm* — Lawrence Xin-Tao Yu

(57) ABSTRACT

Systems and methods for detecting and removing erroneous tire pressure values are provided. The method involves operating at least one processor to: receive tire pressure data comprising a time series of tire pressure values; simplify the tire pressure data by removing at least some of the tire pressure values that satisfy a predetermined interpolation error threshold; detect, using a trained machine learning classifier, at least one erroneous tire pressure value in the tire pressure data, each erroneous tire pressure value being detected based on the erroneous tire pressure value and a plurality of lagging tire pressure values consecutively trailing the erroneous tire pressure value; clean the tire pressure data by removing the at least one erroneous tire pressure value; and transmit the tire pressure data to a fleet management system, whereby the at least one erroneous tire pressure value is not transmitted to the fleet management system.

21 Claims, 10 Drawing Sheets

| Current Value | Lag 1 Value | Lag 2 Value | Lag 3 Value | Lag 4 Value | Lag 5 Value | Lag 6 Value | Lag 7 Value | Valid |
|---|---|---|---|---|---|---|---|---|
| 400 | 401 | 402 | 400 | 309 | 400 | 400 | 400 | Y |
| 1036 | 400 | 401 | 402 | 400 | 309 | 400 | 400 | N |
| 401 | 399 | 400 | 401 | 398 | 400 | 400 | 401 | Y |

| Current Time | Lag 1 Time | Lag 2 Time | Lag 3 Time | Lag 4 Time | Lag 5 Time | Lag 6 Time | Lag 7 Time |
|---|---|---|---|---|---|---|---|
| 516 | 451 | 406 | 356 | 309 | 269 | 215 | 202 |
| 1036 | 900 | 803 | 719 | 621 | 509 | 405 | 301 |
| 701 | 658 | 602 | 541 | 509 | 451 | 402 | 354 |

SYSTEMS AND METHODS FOR DETECTING AND REMOVING ERRONEOUS TIRE PRESSURE VALUES

CROSS-REFERENCE TO RELATED APPLICATIONS

This application claims priority to U.S. Provisional Patent Application No. 63/443,840 filed Feb. 7, 2023 and titled "SYSTEMS AND METHODS FOR DETECTING AND REMOVING ERRONEOUS TIRE PRESSURE VALUES", the contents of which are incorporated herein by reference for all purposes.

FIELD

The embodiments described herein generally relate to vehicles and telematics data, and in particular, to detecting and removing erroneous tire pressure values.

BACKGROUND

The following is not an admission that anything discussed below is part of the prior art or part of the common general knowledge of a person skilled in the art.

Vehicles can include tire-pressure monitoring systems (TPMS) that monitor the air pressure inside the tires of the vehicle. Through early detection of under-inflated or over-inflated tires, TPMS can reduce the likelihood of vehicle accidents, improve fuel economy, and reduce tire wear. TPMS have been widely adopted in many passenger cars and are mandatory in many jurisdictions for new passenger cars. TPMS can include direct TPMS (dTPMS) that directly measure tire pressure using physical pressure sensors and indirect TPMS (iTPMS) that infer tire pressure by performing signal processing on other types of sensor signals, such as acceleration, wheel speed, etc. In some cases, TPMS can generate erroneous tire pressure values that do not correctly represent the actual air pressure inside the tires. As a result, tire pressure values obtained from a vehicle may contain erroneous values. It is not always known why TPMS sometimes generate erroneous values. It would be desirable to detect and remove erroneous tire pressure values to improve tire pressure data accuracy. However, it can be difficult to distinguish erroneous tire pressure values from valid tire pressure values.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with a broad aspect, there is provided a method for detecting and removing erroneous tire pressure values. The method involves operating at least one processor of a telematics device to: receive, from a vehicle, tire pressure data including a time series of tire pressure values; simplify the tire pressure data by removing at least some of the tire pressure values that satisfy a predetermined interpolation error threshold; detect, using a trained machine learning classifier, at least one erroneous tire pressure value in the tire pressure data, each erroneous tire pressure value being detected based on the erroneous tire pressure value and a plurality of lagging tire pressure values consecutively trailing the erroneous tire pressure value; clean the tire pressure data by removing the at least one erroneous tire pressure value; and transmit the tire pressure data to a fleet management system, whereby the at least one erroneous tire pressure value is not transmitted to the fleet management system.

In some embodiments, the machine learning classifier can detect each erroneous tire pressure value further based on a plurality of relative time values associated with the erroneous tire pressure value and the plurality of lagging tire pressure values.

In some embodiments, the machine learning classifier can be trained using a plurality of tire pressure value samples, each tire pressure value sample including a consecutive sequence of tire pressure values.

In some embodiments, the machine learning classifier can be trained further using a plurality of time value samples, each time value sample including a consecutive sequence of relative time values associated with the consecutive sequence of tire pressure values.

In some embodiments, the plurality of tire pressure value samples can include a plurality of erroneous tire pressure value samples, each erroneous tire pressure value sample including one or more erroneous tire pressure values.

In some embodiments, at least some of the plurality of erroneous tire pressure value samples can include one or more valid tire pressure values.

In some embodiments, the plurality of tire pressure value samples can include a plurality of valid tire pressure value samples, the plurality of valid tire pressure value samples including a plurality of valid tire pressure values.

In some embodiments, the plurality of tire pressure value samples can be collected from a plurality of different vehicle types.

In some embodiments, the machine learning classifier can be a binary classifier operable to classify a tire pressure value as valid or erroneous.

In some embodiments, the machine learning classifier can be a tree-based classifier.

In some embodiments, simplifying the tire pressure data can involve determining an interpolation error of removing the at least some of the tire pressure values based on a Ramer-Douglas-Peucker algorithm.

In accordance with a broad aspect, there is provided a telematics device. The telematics device includes at least one processor operable to: receive, from a vehicle, tire pressure data including a time series of tire pressure values; simplify the tire pressure data by removing at least some of the tire pressure values that satisfy a predetermined interpolation error threshold; detect, using a trained machine learning classifier, at least one erroneous tire pressure value in the tire pressure data, each erroneous tire pressure value being detected based on the erroneous tire pressure value and a plurality of lagging tire pressure values consecutively trailing the erroneous tire pressure value; clean the tire pressure data by removing the at least one erroneous tire pressure value; and transmit the tire pressure data to a fleet management system, whereby the at least one erroneous tire pressure value is not transmitted to the fleet management system.

In some embodiments, the machine learning classifier can detect each erroneous tire pressure value further based on a plurality of relative time values associated with the erroneous tire pressure value and the plurality of lagging tire pressure values.

In some embodiments, the machine learning classifier can be trained using a plurality of tire pressure value samples, each tire pressure value sample including a consecutive sequence of tire pressure values.

In some embodiments, the machine learning classifier can be trained further using a plurality of time value samples, each time value sample including a consecutive sequence of relative time values associated with the consecutive sequence of tire pressure values.

In some embodiments, the plurality of tire pressure value samples can include a plurality of erroneous tire pressure value samples, each erroneous tire pressure value sample including one or more erroneous tire pressure values.

In some embodiments, at least some of the plurality of erroneous tire pressure value samples can include one or more valid tire pressure values.

In some embodiments, the plurality of tire pressure value samples can include a plurality of valid tire pressure value samples, the plurality of valid tire pressure value samples including a plurality of valid tire pressure values.

In some embodiments, the plurality of tire pressure value samples can be collected from a plurality of different vehicle types.

In some embodiments, the machine learning classifier can be a binary classifier operable to classify a tire pressure value as valid or erroneous.

In some embodiments, the machine learning classifier can be a tree-based classifier.

In some embodiments, simplifying the tire pressure data can involve determining an interpolation error of removing the at least some of the tire pressure values based on a Ramer-Douglas-Peucker algorithm.

In accordance with a broad aspect, there is provided a method for training a machine learning classifier to detect erroneous tire pressure values. The method involves operating at least one processor to: retrieve tire pressure data, the tire pressure data including a plurality of time series of tire pressure values originating from a plurality of vehicles; generate histogram representations of the tire pressure data, a histogram representation being generated for each vehicle type; identify, from tire pressure data, a plurality of erroneous tire pressure values based on logarithmic comparisons of adjacent tire pressure value count features in each histogram representation; identify, from the tire pressure data, a plurality of erroneous tire pressure value patterns based on the plurality of erroneous tire pressure values; generate a plurality of tire pressure value samples based on the plurality of erroneous tire pressure values and the plurality of erroneous tire pressure value patterns; and train the machine learning classifier using the plurality of tire pressure value samples.

In some embodiments, generating the plurality of tire pressure value samples can involve: receiving a second set of tire pressure data including a second plurality of time series of tire pressure values; labeling the tire pressure values in the second set of tire pressure data based on the plurality of erroneous tire pressure values and the plurality of erroneous tire pressure value patterns; and generating the tire pressure value samples from the labeled tire pressure values in the second set of tire pressure data.

In some embodiments, identifying the plurality of erroneous tire pressure value patterns can involve identifying consecutive sequences of tire pressure values containing one or more erroneous tire pressure values and satisfying a value change threshold.

In some embodiments, identifying the plurality of erroneous tire pressure value patterns can involve identifying consecutive sequences of tire pressure values containing one or more erroneous tire pressure values for a plurality of different vehicles.

In some embodiments, the logarithmic comparisons can include comparisons between adjacent histogram bin heights and between adjacent histogram bin percentage ranks.

In some embodiments, each tire pressure value sample can include a consecutive sequence of tire pressure values.

In some embodiments, the machine learning classifier can be trained further using a plurality of time value samples, each time value sample including a consecutive sequence of relative time values associated with the consecutive sequence of tire pressure values.

In some embodiments, the plurality of tire pressure value samples can include a plurality of erroneous tire pressure value samples, each erroneous tire pressure value sample including one or more erroneous tire pressure values.

In some embodiments, the plurality of erroneous tire pressure value samples can include one or more valid tire pressure values.

In some embodiments, the plurality of tire pressure value samples can include a plurality of valid tire pressure value samples, the plurality of valid tire pressure value samples including a plurality of valid tire pressure values.

In some embodiments, the plurality of tire pressure value samples can be collected from a plurality of different vehicle types.

In some embodiments, the machine learning classifier can be a binary classifier operable to classify a tire pressure value as valid or erroneous.

In some embodiments, the machine learning classifier can be a tree-based classifier.

In accordance with a broad aspect, there is provided a system for training a machine learning classifier to detect erroneous tire pressure values. The system includes: at least one data storage operable to store tire pressure data, the tire pressure data including a plurality of time series of tire pressure values originating from a plurality of vehicles; and at least one processor in communication with the at least one data storage, the at least one processor operable to: retrieve the tire pressure data; generate histogram representations of the tire pressure data, a histogram representation being generated for each vehicle type; identify, from tire pressure data, a plurality of erroneous tire pressure values based on logarithmic comparisons of adjacent tire pressure value count features in each histogram representation; identify, from the tire pressure data, a plurality of erroneous tire pressure value patterns based on the plurality of erroneous tire pressure values; generate a plurality of tire pressure value samples based on the plurality of erroneous tire pressure values and the plurality of erroneous tire pressure value patterns; and train the machine learning classifier using the plurality of tire pressure value samples.

In some embodiments, generating the plurality of tire pressure value samples can involve: receiving a second set of tire pressure data including a second plurality of time series of tire pressure values; labeling the tire pressure values in the second set of tire pressure data based on the plurality of erroneous tire pressure values and the plurality of erroneous tire pressure value patterns; and generating the tire pressure value samples from the labeled tire pressure values in the second set of tire pressure data.

In some embodiments, identifying the plurality of erroneous tire pressure value patterns can involve identifying consecutive sequences of tire pressure values containing one or more erroneous tire pressure values and satisfying a value change threshold.

In some embodiments, identifying the plurality of erroneous tire pressure value patterns can involve identifying consecutive sequences of tire pressure values containing one or more erroneous tire pressure values for a plurality of different vehicles.

In some embodiments, the logarithmic comparisons can include comparisons between adjacent histogram bin heights and between adjacent histogram bin percentage ranks.

In some embodiments, each tire pressure value sample can include a consecutive sequence of tire pressure values.

In some embodiments, the machine learning classifier can be trained further using a plurality of time value samples, each time value sample including a consecutive sequence of relative time values associated with the consecutive sequence of tire pressure values.

In some embodiments, the plurality of tire pressure value samples can include a plurality of erroneous tire pressure value samples, each erroneous tire pressure value sample including one or more erroneous tire pressure values.

In some embodiments, at least some of the plurality of erroneous tire pressure value samples can include one or more valid tire pressure values.

In some embodiments, the plurality of tire pressure value samples can include a plurality of valid tire pressure value samples, the plurality of valid tire pressure value samples including a plurality of valid tire pressure values.

In some embodiments, the plurality of tire pressure value samples can be collected from a plurality of different vehicle types.

In some embodiments, the machine learning classifier can be a binary classifier operable to classify a tire pressure value as valid or erroneous.

In some embodiments, the machine learning classifier can be a tree-based classifier.

In accordance with a broad aspect, there is provided a non-transitory computer readable medium having instructions stored thereon executable by at least one processor to implement any one of the methods herein.

BRIEF DESCRIPTION OF THE DRAWINGS

Several embodiments will be described in detail with reference to the drawings, in which.

Figure 1:
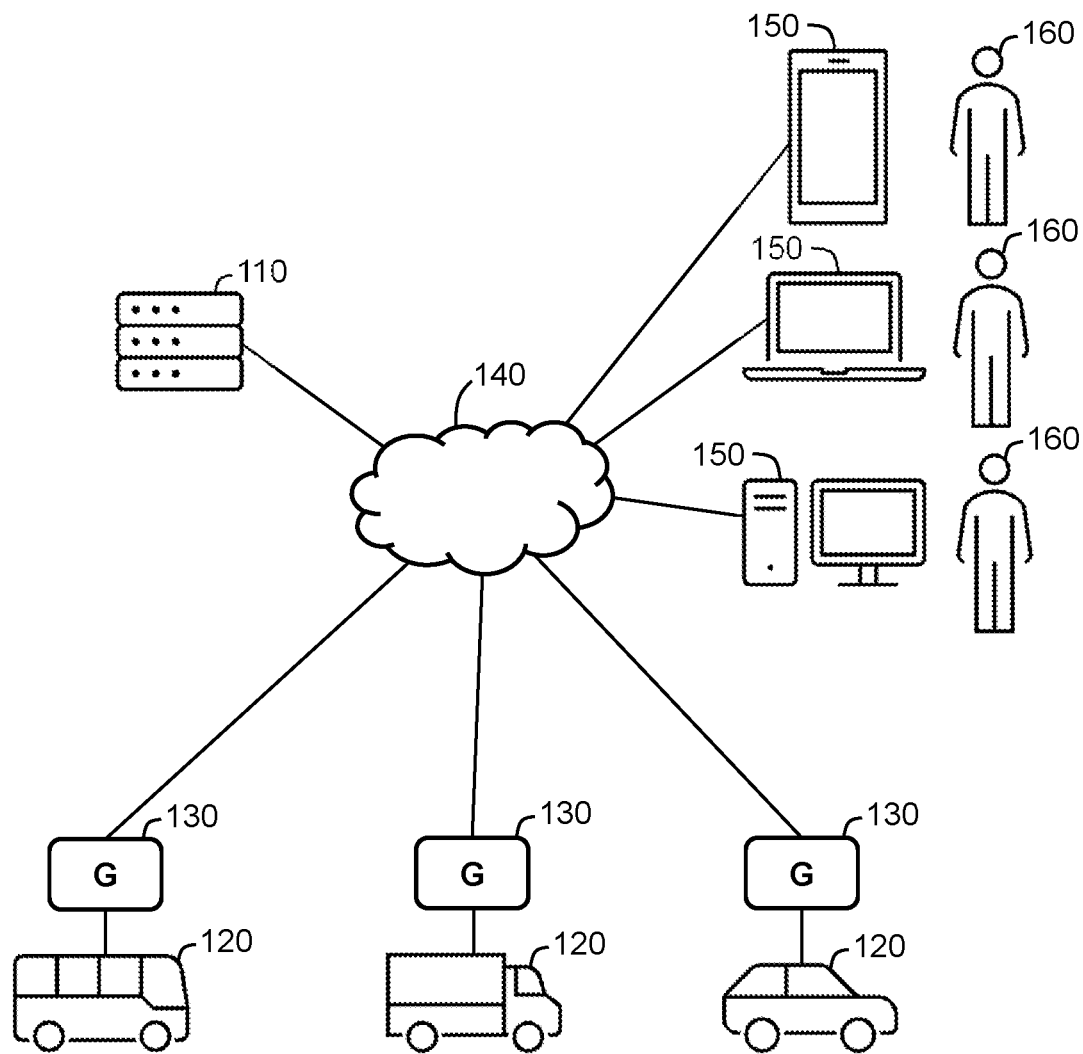
FIG. 1 is a block diagram of various components interacting with an example fleet management system, in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DETAILED DESCRIPTION

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Referring to FIG. 1, there is shown an example fleet management system 110 for managing a plurality of assets equipped with a plurality of telematics devices 130. In operation, the telematics devices 130 can gather various data associated with the assets (i.e., telematics data) and share the telematics data with the fleet management system 110. The fleet management system 110 can be remotely located from the telematics devices 130 and the assets.

For ease of exposition, various examples will now be described in which the assets are vehicles 120. However, it should be appreciated that the systems and methods described herein may be used to manage other forms of assets in some embodiments. Such assets can generally include any apparatuses, articles, machines, and/or equipment that can be equipped and monitored by the telematics devices 130. For example, other assets may include shipping containers, trailers, construction equipment, generators, and the like. The nature and format of the telematics data may vary depending on the type of asset.

The vehicles 120 may include any machines for transporting goods or people. The vehicles 120 can include motor vehicles, such as, but not limited to, motorcycles, cars, trucks, and/or buses. The motor vehicles can be gas, diesel, electric, hybrid, and/or alternative fuel. In some cases, the vehicles 120 may include other kinds of vehicles, such as, but not limited to, railed vehicles (e.g., trains, trams), watercraft (e.g., ships, boats), aircraft (e.g., airplanes, helicopters), and/or spacecraft. Each vehicle 120 can be equipped with a telematics device 130. Although only three vehicles 120 having three telematics devices 130 are shown in the illustrated example for ease of illustration, it should be appreciated that there can be any number of vehicles 120 and telematics devices 130. In some cases, the fleet management system 110 may manage hundreds, thousands, or even millions of vehicles 120 and telematics devices 130.

The telematics devices 130 can be standalone devices that are removably installed in the vehicles 120. Alternatively, the telematics devices 130 can be integrated components that are integral with the vehicles 120. The telematics devices 130 can gather various telematics data from the vehicles 120 and share the telematics data with the fleet management system 110. The telematics data may include any information, parameters, attributes, characteristics, and/or features associated with the vehicles 120. For example, the telematics data can include, but is not limited to, location data, speed data, acceleration data, engine data, brake data, transmission data, fluid data (e.g., oil, coolant, and/or washer fluid), energy data (e.g., battery and/or fuel level), odometer data, vehicle identifying data, error/diagnostic data, tire pressure data, seatbelt data, and/or airbag data. In some cases, the telematics data may include information related to the telematics devices 130 and/or other devices associated with the telematics devices 130.

The fleet management system 110 can process the telematics data collected from the telematics devices 130 to provide various analysis, predictions, and reporting. For example, the fleet management system 110 can process the telematics data to gain additional information regarding the vehicles 120, such as, but not limited to, trip distances/times, idling times, harsh braking/driving, usage rate, and/or fuel economy. Various data analytics and machine learning techniques may be used by the fleet management system 110 to process the telematics data. The telematics data can then be used to manage various aspects of the vehicles 120, such as, but not limited to, route planning, vehicle maintenance, driver compliance, asset utilization, and/or fuel management. In this manner, the fleet management system 110 can improve the productivity, efficiency, safety, and/or sustainability of the vehicles 120.

A plurality of computing devices 150 can provide access to the fleet management system 110 to a plurality of users 160. This may allow the users 160 to manage and track the vehicles 120, for example, using various telematics data collected and/or processed by the fleet management system 110. The computing devices 150 can be any computers, such as, but not limited to, personal computers, portable computers, wearable computers, workstations, desktops, laptops, smartphones, tablets, smartwatches, PDAs (personal digital assistants), and/or mobile devices. The computing devices 150 can be remotely located from the fleet management system 110, telematics devices 130, and vehicles 120. Although only three computing devices 150 operated by three users 160 are shown in the illustrated example for ease of illustration, it should be appreciated that there can be any number of computing devices 150 and users 160. In some cases, the fleet management system 110 may service hundreds, thousands, or even millions of computing devices 150 and users 160.

The fleet management system 110, telematics devices 130, and computing devices 150 can communicate through one or more networks 140. The networks 140 may be wireless, wired, or a combination thereof. The networks 140 may employ any communication protocol and utilize any communication medium. For example, the networks 140 may include, but is not limited to, Wi-Fi™ networks, Ethernet networks, Bluetooth™ networks, NFC (near-field communication) networks, radio networks, cellular networks, and/or satellite networks. The networks 140 may be private, public, or a combination thereof. For example, the networks 140 may include, but is not limited to, LANs (local area networks), WANs (wide area networks), and/or the Internet. The networks 140 may also facilitate communication with other devices and systems that are not shown.

The fleet management system 110 can be implemented using one or more computers. For example, the fleet management system 110 may be implemented using one or more computer servers. The servers can be distributed across a wide geographical area. In some embodiments, the fleet management system 110 may be implemented using a cloud computing platform, such as Google Cloud Platform™ or Amazon Web Services™. In other embodiments, the fleet management system 110 may be implemented using one or more dedicated computer servers.

Figure 2:
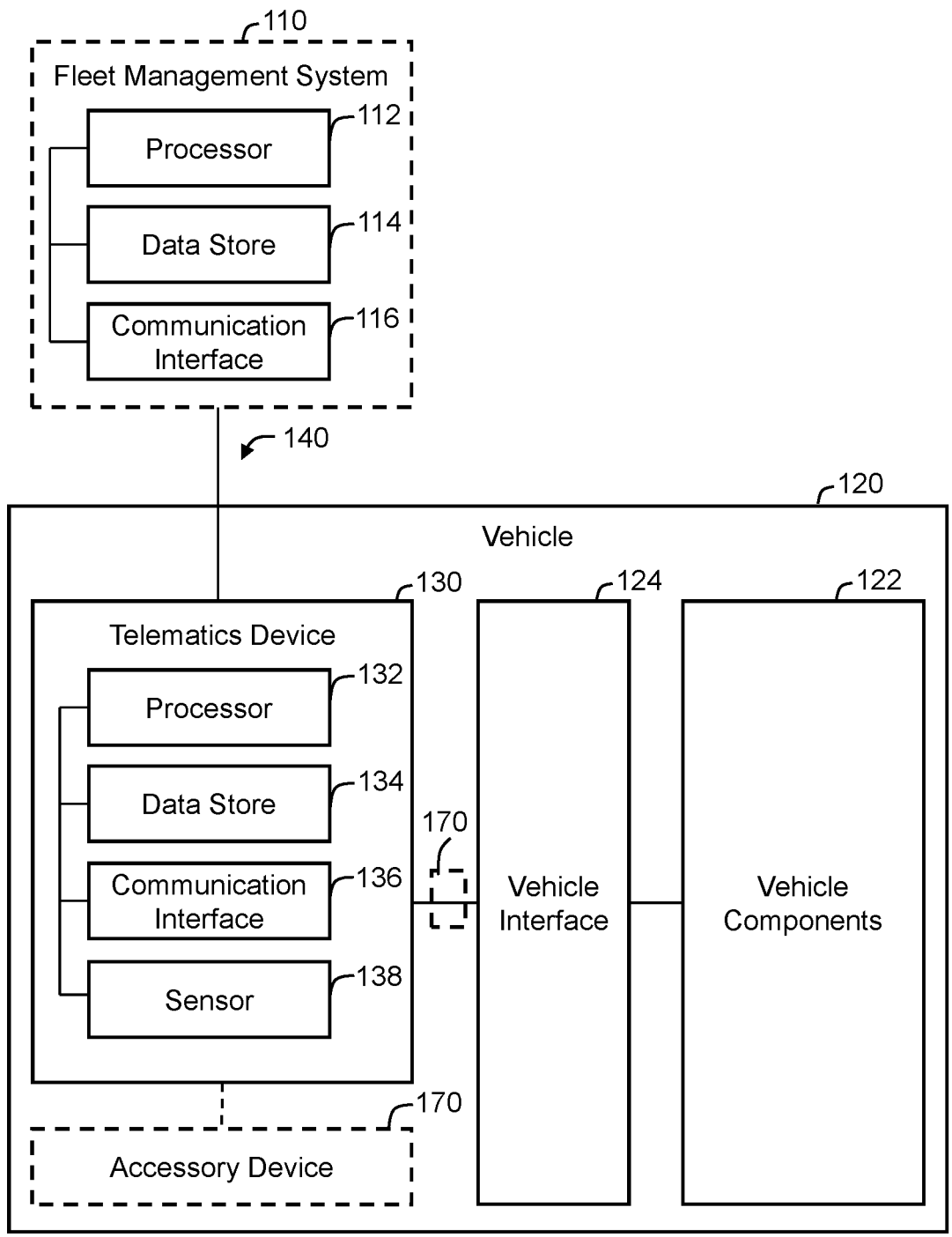
FIG. 2 is a block diagram of an example fleet management system interacting with an example telematics device and example vehicle, in accordance with an embodiment.

Reference will now be made to FIG. 2 to further explain the operation of the fleet management system 110, telematics devices 130, and vehicles 120. In the illustrated example, the fleet management system 110 in communication with a telematics device 130 that is installed in a vehicle 120.

As shown, the fleet management system 110 can include one or more processors 112, one or more data stores 114, and one or more communication interfaces 116. Each of these components may communicate with each other. Each of these components may be combined into fewer components or divided into additional subcomponents. Two or more of these components and/or subcomponents may be distributed across a wide geographical area.

The processors 112 can control the operation of the fleet management system 110. The processors 112 can be implemented using any suitable processing devices or systems, such as, but not limited to, CPUs (central processing units), GPUs (graphics processing units), FPGAs, (field programmable gate arrays), ASICs (application specific integrated circuits), DSPs (digital signal processors), NPUs (neural processing units), QPUs (quantum processing units), microprocessors, and/or controllers. The processors 112 can execute various computer instructions, programs, and/or software stored on the data stores 114 to implement various methods described herein. For example, the processors 112 may process various telematics data collected by the fleet management system 110 from the telematics device 130.

The data stores 114 can store various data for the fleet management system 110. The data stores 114 can be implemented using any suitable data storage devices or systems, such as, but not limited to, RAM (random access memory), ROM (read only memory), flash memory, HDD (hard disk drives), SSD (solid-state drives), magnetic tape drives, optical disc drives, and/or memory cards. The data stores 114 may include volatile memory, non-volatile memory, or a combination thereof. The data stores 114 may include non-transitory computer readable media. The data stores 114 can store various computer instructions, programs, and/or software that can be executed by the processors 112 to implement various methods described herein. The data stores 114 may store various telematics data collected from the telematics device 130 and/or processed by the processors 112.

The communication interfaces 116 can enable communication between the fleet management system 110 and other devices or systems, such as the telematics device 130. The communication interfaces 116 can be implemented using any suitable communication devices or systems. For example, the communication interfaces 116 may include various physical connectors, ports, or terminals, such as, but not limited to, USB (universal serial bus), Ethernet, Thunderbolt, Firewire, SATA (serial advanced technology attachment), PCI (peripheral component interconnect), HDMI (high-definition multimedia interface), and/or DisplayPort. The communication interfaces 116 can also include various wireless interface components to connect to wireless networks, such as, but not limited to, Wi-Fi™, Bluetooth™, NFC, cellular, and/or satellite. The communication interfaces 116 can enable various inputs and outputs to be received at and sent from the fleet management system 110. For example, the communication interfaces 116 may be used to retrieve telematics data from the telematics device 130.

As shown, the telematics device 130 also can include one or more processors 132, one or more data stores 134, and one or more communication interfaces 136. Additionally, the telematics device 130 can include one or more sensors 138. Each of these components may communicate with each other. Each of these components may be combined into fewer components or divided into additional subcomponents.

The processors 132 can control the operation of the telematics device 130. Like the processors 112 of the fleet management system 110, the processors 132 of the telematics device 130 can be implemented using any suitable processing devices or systems. The processors 132 can execute various computer instructions, programs, and/or software stored on the data stores 134. For example, the processors 132 can process various telematics data gathered from the vehicle components 122 or the sensors 138.

The data stores 134 can store various data for the telematics device 130. Like the data stores 114 of the fleet management system 110, the data stores 134 of the telematics device 130 can be implemented using any suitable data storage devices or systems. The data stores 134 can store various computer instructions, programs, and/or software that can be executed by the processors 132. The data stores 134 can also store various telematics data gathered from the vehicle components 122 or the sensors 138.

The communication interfaces 136 can enable communication between the telematics device 130 and other devices or systems, such as the fleet management system 110 and vehicle components 122. Like the communication interfaces 116 of the fleet management system 110, the communication interfaces 136 of the telematics device 130 can be implemented using any suitable communication devices or systems. The communication interfaces 136 can enable various inputs and outputs to be received at and sent from the telematics device 130. For example, the communication interfaces 136 may be used collect telematics data from the vehicle components 122 and sensors 138 or to send telematics data to the fleet management system 110. The communication interfaces 136 can also be used to connect the telematics device 130 with one or more accessory devices 170.

The sensors 138 can detect and/or measure various environmental events and/or changes. The sensors 138 can include any suitable sensing devices or systems, including, but not limited to, location sensors, velocity sensors, acceleration sensors, orientation sensors, vibration sensors, proximity sensors, temperature sensors, humidity sensors, pressure sensors, optical sensors, and/or audio sensors. When the telematics device 130 is installed in the vehicle 120, the sensor 138 can be used to gather telematics data that may not be obtainable from the vehicle components 122. For example, the sensors 138 may include a satellite navigation device, such as, but not limited to, a GPS (global positioning system) receiver, which can measure the location of the vehicle 120. As another example, the sensor 138 may include accelerometers, gyroscopes, magnetometers, and/or IMUs (inertial measurement units), which can measure the acceleration and/or orientation of the vehicle 120.

In some cases, the telematics device 130 may operate in conjunction with one or more accessory devices 170 that are in communication with the telematics device 130. The accessory devices 170 can include expansion devices that can provide additional functionality to the telematics device 130. For example, the accessory devices 170 may provide additional processing, storage, communication, and/or sensing functionality through one or more additional processors, data storages, communication interfaces, and/or sensors (not shown). The accessory devices 170 can also include adapter devices that facilitate communication between the communication interface 136 and the vehicle interfaces 124, such as a cable harness.

The telematics device 130 can be installed within the vehicle 120, removably or integrally. One or more accessory devices 170 can also be installed in the vehicle 120 along with the telematics device 130. As shown, the vehicle 120 can include one or more vehicle components 122 and one or more vehicle interfaces 124. Each of these components may be combined into fewer components or divided into additional subcomponents.

The vehicle components 122 can include any subsystems, parts, and/or subcomponents of the vehicle 120. The vehicle components 122 can be used to operate and/or control the vehicle 120. For example, the vehicle components 122 can include, but are not limited to, powertrains, engines, transmissions, steering, braking, seating, batteries, doors, and/or suspensions. The telematics device 130 can gather various telematics data from the vehicle components 122. For example, the telematics device 130 may communicate with one or more ECUs (electronic control units) that control the vehicle components 122 and/or one or more internal vehicle sensors.

The vehicle interfaces 124 can facilitate communication between the vehicle components 122 and other devices or systems. The vehicle interfaces 124 can include any suitable communication devices or systems. For example, the vehicle interfaces 124 may include, but is not limited to, ODB-II (on-board diagnostics) ports and/or CAN (controller area network) buses. The vehicle interfaces 124 can be used by the telematics device 130 to gather telematics data from the vehicle components 122. For example, the communication interfaces 136 of the telematics device 130 can be connected to the vehicle interfaces 124 to communicate with the vehicle components 122. In some cases, an accessory device 170, such as a wire harness, can provide the connection between the communication interface 136 and the vehicle interface 124.

Figure 3:
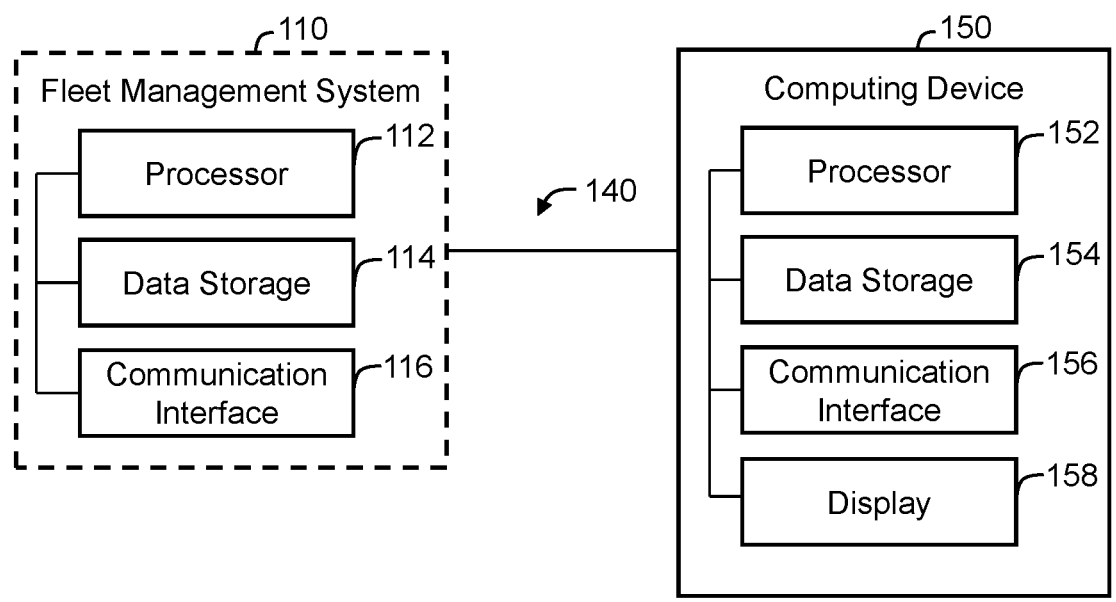
FIG. 3 is a block diagram of an example computing device interacting with an example fleet management system, in accordance with an embodiment.

Reference will now be made to FIG. 3 to further explain the operation of the fleet management system 110 and computing devices 150. In the illustrated example, the fleet management system 110 in communication with a computing device 150. As shown, the computing device 150 also can include one or more processors 152, one or more data stores 154, and one or more communication interfaces 156. Additionally, the computing device 150 can include one or more displays 158. Each of these components can communicate with each other. Each of these components may be combined into fewer components or divided into additional subcomponents.

The processors 152 can control the operation of the computing device 150. Like the processors 112 of the fleet management system 110 and the processors 132 of the telematics device 130, the processors 152 of the computing device 150 can be implemented using any suitable processing devices or systems. The processors 152 can execute various computer instructions, programs, and/or software stored on the data stores 154 to implement various methods described herein. For example, the processors 152 may process various telematics data received from the fleet management system 110 and/or the telematics device 130.

The data stores 154 can store various data for the computing device 150. Like the data stores 114 of the fleet management system 110 and the data stores 134 of the telematics device 130, the data stores 154 of the computing device 150 can be implemented using any suitable data storage devices or systems. The data stores 154 can store various computer instructions, programs, and/or software that can be executed by the processor 152 to implement various methods described herein. The data stores 154 may store various telematics data received from the fleet management system 110 and/or the telematics device 130.

The communication interfaces 156 can enable communication between the computing device 150 and other devices or systems, such as the fleet management system 110. Like the communication interfaces 116 of the fleet management system 110 and the communication interfaces 136 of the telematics device 130, the communication interfaces 156 of the computing device 150 can be implemented using any suitable communication devices or systems. The communication interfaces 156 can enable various inputs and outputs to be received at and sent from the computing device 150. For example, the communication interfaces 116 may be used to retrieve telematics data from the fleet management system 110.

The displays 158 can visually present various data for the computing device 150. The displays 158 can be implemented using any suitable display devices or systems, such as, but not limited to, LED (light-emitting diode) displays, LCDs (liquid crystal displays), ELDs (electroluminescent displays), plasma displays, quantum dot displays, and/or cathode ray tube (CRT) displays. The displays 158 can be an integrated component that is integral with the computing device 150 or a standalone device that is removably connected to the computing device 150. The displays 158 can present various user interfaces for various computer applications, programs, and/or software associated with various methods described herein. For example, the displays 158 may display various visual representations of the telematics data.

Figure 4:
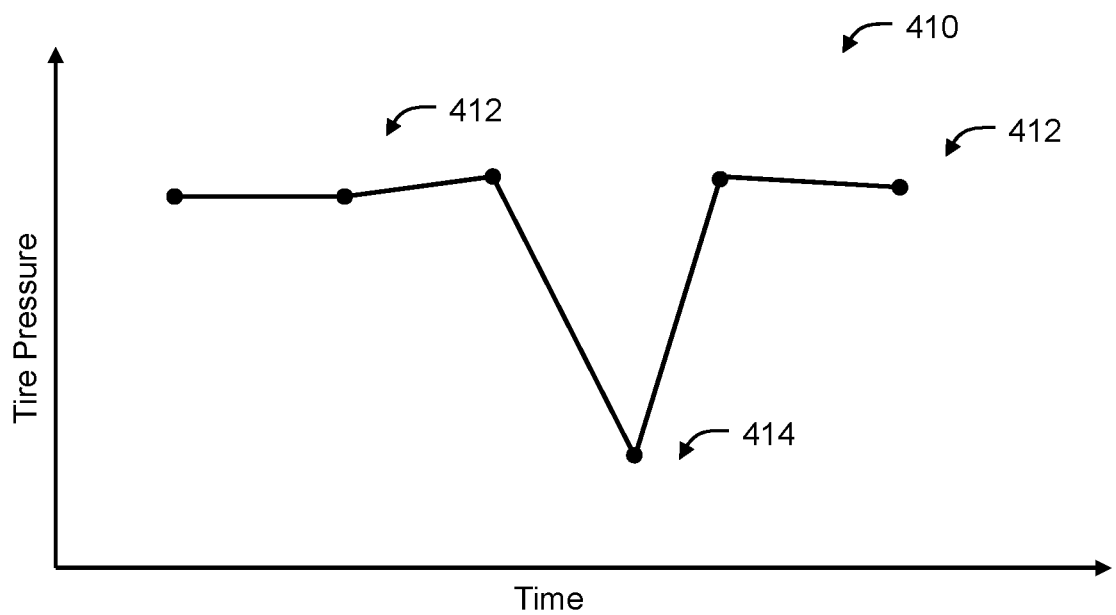
FIG. 4 is a graph of example tire pressure data, in accordance with an embodiment.
Figure 5:
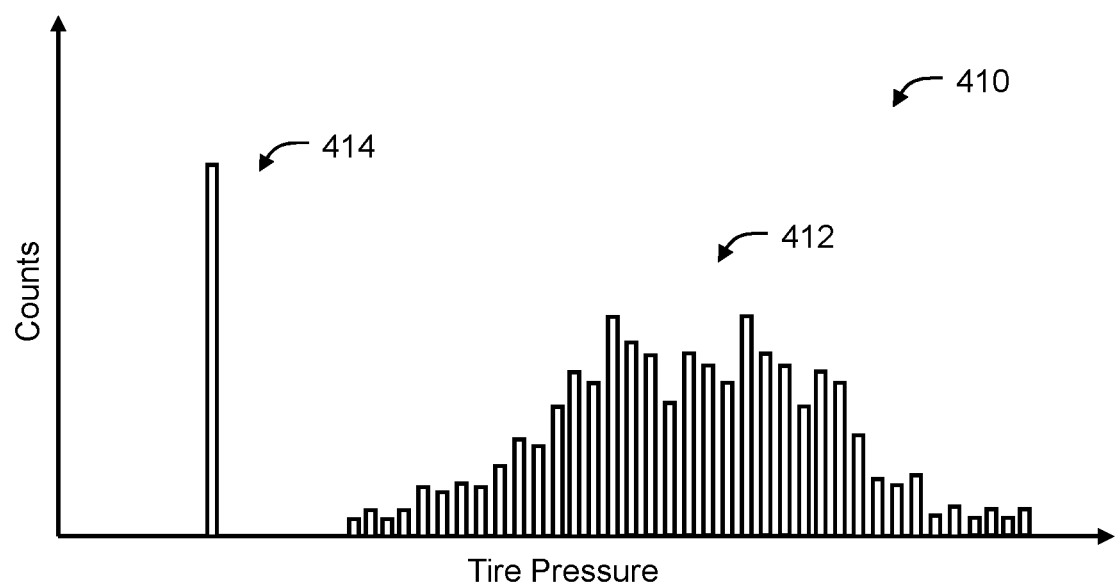
FIG. 5 is a histogram of example tire pressure data, in accordance with an embodiment.

Reference will now be made to FIGS. 4 and 5, which illustrate example tire pressure data 410. FIG. 4 illustrates tire pressure data 410 collected from a single vehicle 120, whereas FIG. 5 illustrates tire pressure data 410 collected from a plurality of vehicles 120 of the same vehicle type (e.g., make, model, and/or year). The tire pressure data 410 can be collected from the vehicles 120 by telematics devices 130. The tire pressure data 410 can originate from the TPMSs (tire pressure monitoring systems) of the vehicles 120, for example, from one or more pressure or other sensors of the TPMSs. The tire pressure data 410 can be collected by the telematics devices 130 from the TPMSs though one or more vehicle interfaces 124, such as an ODB-II port and/or CAN bus. The tire pressure data 410 may be stored at the telematics device 130, fleet management system 110, computing device 150, or a combination thereof.

The tire pressure data 410 can include various time series of tire pressure values. In other words, the tire pressure data 410 can include a plurality of data points, with each data point representing a tire pressure value at a particular point in time. As shown, the tire pressure data 410 can include normal or valid tire pressure values 412, as well as erroneous tire pressure values 414.

Valid tire pressure values 412 can include tire pressure values that correctly represent the air pressure inside the tires of the vehicle 120. In contrast, erroneous tire pressure values 414 can include tire pressure values that are invalid and do not correctly represent the air pressure inside the tires of the vehicle 120. For example, erroneous tire pressure values 414 may include tire pressure values that are physically impossible, such as negative values, excessively large values, or excessively small values. However, in some cases, erroneous tire pressure values 414 may include tire pressure values that are physically possible, but nevertheless do not accurately represent the actual tire pressure of the vehicle 120.

It can be difficult to detect erroneous tire pressure values 414 because it is not always known why erroneous tire values are generated by the TPMS. Additionally, the frequency and magnitude of erroneous tire pressure values 414 can vary across different vehicle types. For example, vehicles 120 of different makes and models may generate different erroneous tire pressure values 414. In some cases, two vehicles 120 of the same make and model but different year may even generate different erroneous tire pressure values 414.

The inventors recognized and realized that machine learning classifiers could be utilized to overcome these challenges. Various embodiments herein relate to training and using machine learning classifiers to detect erroneous tire pressure values 414 that were previously difficult to detect using other methods.

Figure 6:
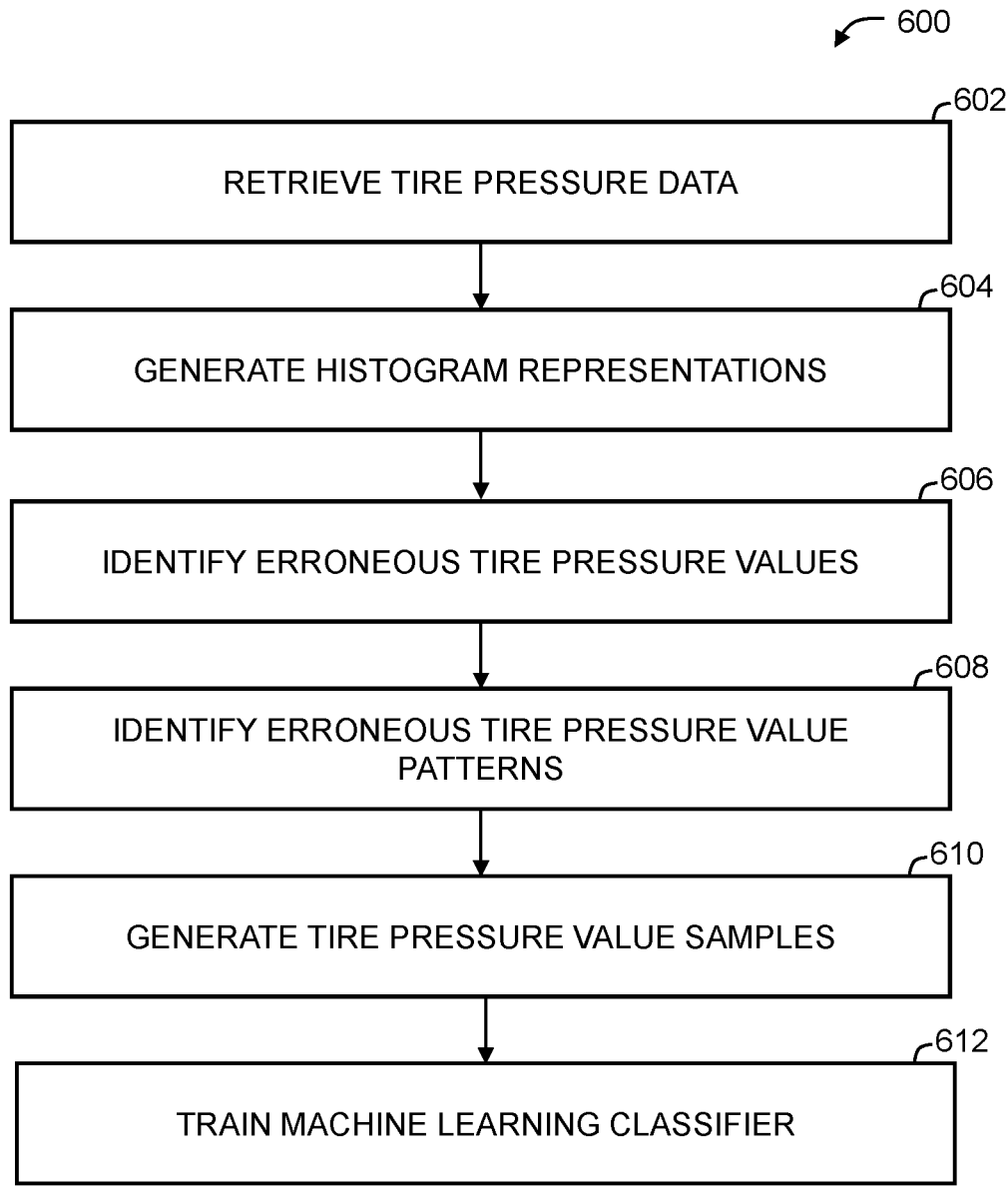
FIG. 6 is a flowchart of an example method for training a machine learning classifier to detect erroneous tire pressure values, in accordance with an embodiment.

Referring now to FIG. 6, there is shown an example method 600 for training a machine learning classifier to detect erroneous tire pressure values 414. Preferably, the machine learning classifier is a tree-based classifier that is trained using a supervised learning approach. For example, the machine learning classifier may be a decision tree, boosted tree, bootstrap aggregated tree, random forest, rotational forest, etc. An advantage of a tree-based classifier is that the classifier can be relatively small in size (as compared to other types of machine learning models) while maintaining good accuracy when tuned (e.g., through hyper-parameter tuning) and can therefore be stored and implemented using a relatively small amount of resources. Furthermore, tree-based models may not require input data to be normalized or standardized (e.g., when the models are trained using raw tire pressure data 410), further reducing computational requirements. Hence, a tree-based classifier may be more easily implemented on a telematics device 130, which may have limited hardware resources.

However, it should be appreciated that the machine learning classifier can generally include any suitable machine learning models. The models may be trained using supervised, unsupervised, semi-supervised, reinforcement, or other types of learning. The models may include, but are not limited to, artificial neural networks, decision trees, support-vector machines, nearest neighbors, linear regressions, logistical regressions, Bayesian networks, random forests, genetic algorithms, ensemble models, and the like. In general, the models may include any machine learning models that are trained to classify whether a tire pressure value is valid or erroneous, without being explicitly programmed to do so.

Preferably, the training method 600 is implemented at the fleet management system 110 (e.g., by at least one processor 112 executing instructions stored on at least one data store 114). An advantage of implementing at least a portion of the training method 600 at the fleet management system 110 (i.e., remote from telematics devices 130 and computing devices 150) is that less processing may be executed at the telematics devices 130 and/or computing devices 150. Hence, the hardware complexity and cost of the telematics devices 130 and/or computing devices 150 can be reduced. Furthermore, it may be easier to update and/or modify software running on the fleet management system 110 as compared to the telematics devices 130 and/or computing devices 150. However, it should be appreciated that the training method 600 may also be implemented, at least in part, using one or more telematics devices 130, one or more computing devices 150, or a combination thereof in some embodiments. That is, the training method 600 may be implemented by any of the one or more processors 112, 132, 152 executing instructions stored on any of the one or more data stores 114, 134, 154.

At 602, tire pressure data 410 can be retrieved. For example, tire pressure data 410 may be retrieved from fleet management system 110, telematics device 130, and/or computing device 150 (e.g., data stores 114, 134, 154). The tire pressure data 410 can originate from a plurality of vehicles 120. For example, the tire pressure data 410 may be collected by a plurality of telematics devices 130 installed in a plurality of vehicles 120. The tire pressure data 410 may originate from a relatively large number of vehicles. For example, the tire pressure data 410 may originate from hundreds, thousands, or even millions of vehicles 120. The plurality of vehicles 120 may include a plurality of different vehicle types. For example, the plurality of vehicles 120 may include vehicles 120 having different makes, models, and/or years. It should be appreciated that the tire pressure data 410 is a form of electronic data that requires a computer to transmit, receive, interpret, process and/or store.

Figure 7:
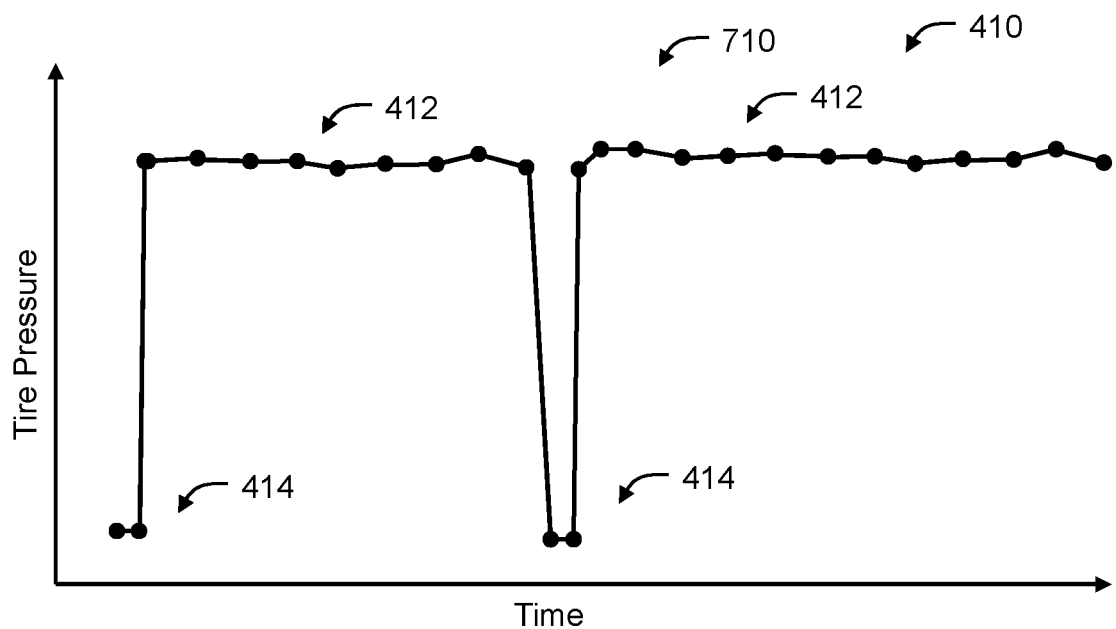
FIG. 7 is a graph of example tire pressure data, in accordance with an embodiment.

The tire pressure data 410 can include a plurality of time series of tire pressure values. As described herein, each time series can include a plurality of data points, with each data point representing a tire pressure value at a particular point in time. For example, referring to FIG. 7, there is shown an example time series of tire pressure values 710 collected from a vehicle 120 that can form part of the tire pressure data 410. As shown, the tire pressure data 410 can include normal or valid tire pressure values 412, as well as erroneous tire pressure values 414.

Figure 8:
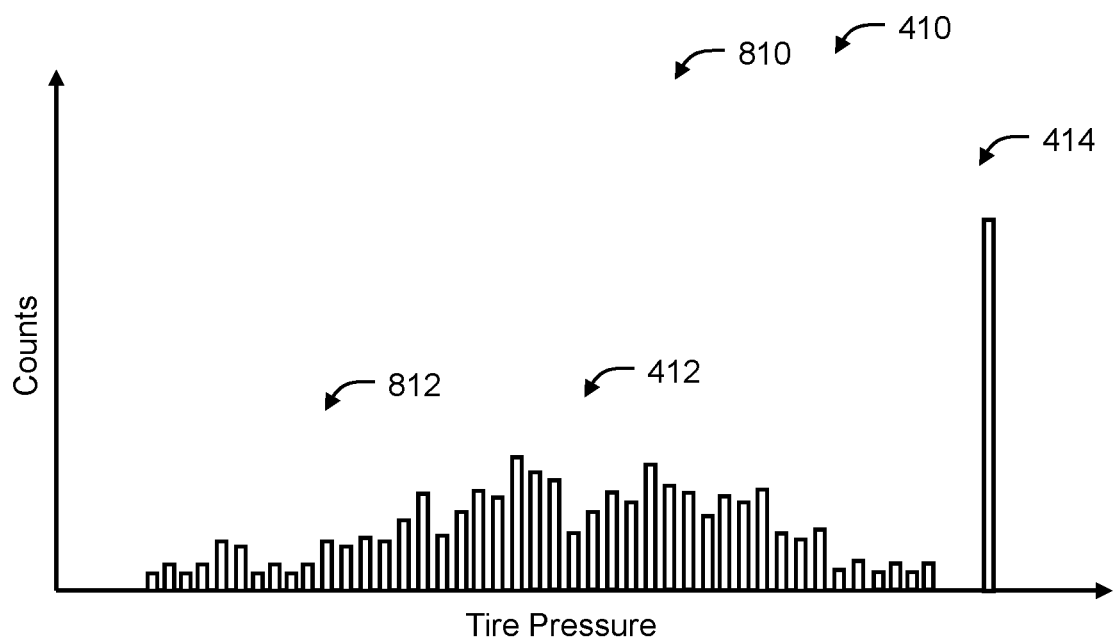
FIG. 8 is a histogram of example tire pressure data, in accordance with an embodiment.

Referring back to FIG. 6, at 604, histogram representations of the tire pressure data 410 can be generated. A histogram representation can be generated for each vehicle type in the plurality of vehicle types in the plurality of vehicles 120 from which the tire pressure data 410 originates. For instance, a histogram representation may be generated for each vehicle 120 having a different make, model, and/or year. For example, referring now to FIG. 8, there is shown an example histogram representation 810. As shown, the histogram representation can include a plurality of bins 812. Each bin 812 can be associated with a tire pressure value (or range of tire pressure values) and represent the number count of occurrences of that tire pressure value (or range of tire pressure values). Hence, the histogram representation 810 can represent a frequency distribution of tire pressure values for a given vehicle type.

Referring back to FIG. 6, at 606, erroneous tire pressure values 414 can be identified from the tire pressure data 410. The erroneous tire pressure values 414 can be identified by detecting outliers in the histogram representations 810. That is, the erroneous tire pressure values 414 can be identified as tire pressure values that differ significantly from other tire pressure values (i.e., valid tire pressure values 412). Preferably, the erroneous tire pressure values 414 can be identified based on logarithmic comparisons of adjacent tire pressure value count features in each histogram representation 810. For example, the logarithmic comparisons may include comparisons between adjacent histogram bin heights and/or between adjacent histogram bin percentage ranks.

In some embodiments, the logarithmic comparisons may involve determining a log of the ratio of adjacent histogram bin heights. For example, the logarithmic comparisons may include:

$$F_{1_{x+1}} = \log\left(\frac{h_x}{h_{x+1}}\right)$$

$$F_{1_{x+2}} = \log\left(\frac{h_x}{h_{x+2}}\right)$$

$$F_{1_{x+3}} = \log\left(\frac{h_x}{h_{x+3}}\right)$$

$$F_{1_{x-1}} = \log\left(\frac{h_x}{h_{x-1}}\right)$$

$$F_{1_{x-2}} = \log\left(\frac{h_x}{h_{x-2}}\right)$$

$$F_{1_{x-3}} = \log\left(\frac{h_x}{h_{x-3}}\right)$$

where $h_x$ is histogram bin height of histogram bin x.

In some embodiments, the logarithmic comparisons may involve determining a log of the ratio of adjacent histogram bin percentage ranks. For example, the logarithmic comparisons may include:

$$F_{2_{x+1}} = \log\left(\frac{r_{x+1}}{r_x}\right)$$

$$F_{2_{x+2}} = \log\left(\frac{r_{x+2}}{r_x}\right)$$

$$F_{2_{x+3}} = \log\left(\frac{r_{x+3}}{r_x}\right)$$

$$F_{2_{x-1}} = \log\left(\frac{r_x}{r_{x-1}}\right)$$

$$F_{2_{x-2}} = \log\left(\frac{r_x}{r_{x-2}}\right)$$

$$F_{2_{x-3}} = \log\left(\frac{r_x}{r_{x-3}}\right)$$

where $r_x$ is the cumulative percentage rank of histogram bin x.

In some embodiments, the logarithmic comparisons may involve a combination of comparisons. For example, the logarithmic comparisons may include:

$$m_1 = \text{mean}(F_{1_{x+1}}, F_{1_{x-1}}) + \text{mean}(F_{2_{x+1}}, F_{2_{x-1}})$$

$$m_2 = \text{mean}(F_{1_{x+2}}, F_{1_{x-2}}) + \text{mean}(F_{2_{x+2}}, F_{2_{x-2}})$$

$$m_3 \times \text{mean}(F_{1_{x+3}}, F_{1_{x-3}}) + \text{mean}(F_{2_{x+3}}, F_{2_{x-3}})$$

In some embodiments, the logarithmic comparisons may involve determining whether a metric exceeds a predetermined threshold. For example, the logarithmic comparisons may involve determining whether $m_1$, $m_2$, and/or $m_3$ exceed a predetermined threshold. For instance, an erroneous tire pressure value 414 may be identified when the minimum of $m_1$, $m_2$, and $m_3$ exceeds the predetermined threshold.

It should be appreciated that although the above examples involve comparing the three closest bins (i.e., x−3 to x+3), any number of adjacent bins may be considered. For example, in some cases, the logarithmic comparisons may involve bins x−5 to x+5, x−7 to x+7, etc. In general, the number of bins may be a parameter that can be adjusted based on the tire pressure data 410.

Figures 9, 10, 11:
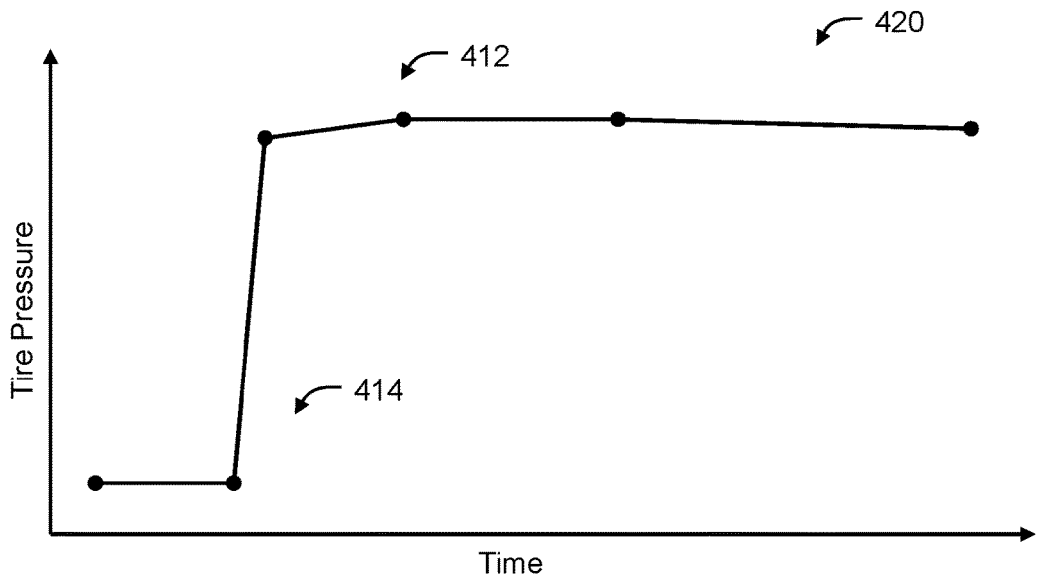
FIG. 9 is a graph of an example erroneous tire pressure value pattern, in accordance with an embodiment.
FIG. 10 is a table of example tire pressure value samples, in accordance with an embodiment.
FIG. 11 is a table of example time value samples, in accordance with an embodiment.

At 608, erroneous tire pressure value patterns can be identified from the tire pressure data 410. Each erroneous tire pressure value pattern can include a consecutive sequence of tire pressure values that contains one or more erroneous tire pressure values 414. For example, referring to FIG. 9, there is shown an example erroneous tire pressure value pattern 420. In the illustrated example, the erroneous tire pressure value pattern 420 includes two erroneous tire pressure values 414 followed by four valid tire pressure values 412. This erroneous tire pressure value pattern 420 can be represented as 92, 92, NV, NV, NV, NV, where NV is a valid (or normal) tire pressure value. However, it should be appreciated that an erroneous tire pressure value pattern 420 may contain any number of valid tire pressure values 412 and erroneous tire pressure values 414.

The erroneous tire pressure value patterns 420 can be identified based on one or more erroneous tire pressure values 414. That is, the erroneous tire pressure value patterns 420 can be identified by identifying the tire pressure values adjacent to one or more erroneous tire pressure values 414. Preferably, the erroneous tire pressure value patterns 420 can be identified by detecting significant changes in tire pressure values adjacent the erroneous tire pressure values 414. This may reduce the false detection of erroneous tire pressure value patterns that are physically impossible or rare. For example, the erroneous tire pressure value patterns 420 may be identified by identifying consecutive sequences of tire pressure values containing one or more erroneous tire pressure values 414 and satisfying a value change threshold. The value change threshold can be any predetermined value that represents a significant change in the tire pressure values. In the example illustrated in FIG. 9, the change in value between the second erroneous tire pressure value 414 and the first valid tire pressure value 412 satisfies the value change threshold. Preferably, the erroneous tire pressure value patterns 420 can also be identified by identifying tire pressure value patterns that are common among a plurality of different vehicles 120 of the same vehicle type. This may reduce the false detection of erroneous tire pressure value patterns caused by rapid deflation or inflation of tires. For example, the erroneous tire pressure value patterns 420 can be identified by identifying consecutive sequences of tire pressure values containing one or more erroneous tire pressure values for a plurality of different vehicles 120.

Referring back to FIG. 6, at 610, tire pressure value samples can be generated. Each tire pressure value sample can include a consecutive sequence of tire pressure values. Preferably, the tire pressure value samples are collected from a plurality of different vehicle types. For example, referring to FIG. 10, there is shown example tire pressure value samples 430. As shown, each tire pressure value sample 430 can include a current tire pressure value 434 and a series of lagging tire pressure values 436 forming a consecutive sequence of tire pressure values.

The tire pressure value samples 430 can include both erroneous tire pressure value samples and valid tire pressure value samples. For instance, in the illustrated example, tire pressure sample 430b is an erroneous tire pressure value sample (i.e., having a current tire pressure value 434 that is invalid), whereas tire pressure samples 430a and 430c are valid tire pressure value samples (i.e., having current tire pressure values 434 that are valid). As shown, each erroneous tire pressure value sample can include one or more one or more erroneous tire pressure values 414, and each valid tire pressure value sample can include a plurality of valid tire pressure values 412. (It should be appreciated that an erroneous tire pressure value sample can also include one or more valid tire pressure values 412.) The tire pressure value samples can 430 be identified as either erroneous or valid based on the erroneous tire pressure values 414 and the erroneous tire pressure value patterns 420. As shown each tire pressure value sample can be labeled to indicate whether that sample is valid or erroneous.

Preferably, a plurality of time value samples can also be generated. Each time value sample can be associated with a tire pressure value sample 430 and include a consecutive sequence of relative time values associated with the consecutive sequence of tire pressure values for the tire pressure value sample 430. For instance, referring to FIG. 11, there is shown example time value samples 440 corresponding to the tire pressure value samples 430 shown in FIG. 10. As shown, each time value sample 430 can include a consecutive sequence of relative time values corresponding to the consecutive sequence of tire pressure values. Accordingly, each time value sample 430 can similarly include a current time value 444 and a series of lagging time values 446.

The tire pressure value samples 430 (and time value samples 440) may be generated from the original set of tire pressure data 410 or using a second set of tire pressure data 410. For example, a second set of tire pressure data may be retrieved, labeled based on the erroneous tire pressure values 414 and erroneous tire pressure value patterns 420, and tire pressure value samples 430 (and time value samples 440) can be generated based on the labeled tire pressure values.

At 612, the machine learning classifier can be trained. The machine learning classifier can be trained using the plurality of tire pressure value samples 430. The machine learning classifier can also be trained using the plurality of time value samples 440. The nature of the training can depend on the of type of machine learning classifier to be trained. Where the machine learning classifier is a decision tree, the training may involve using various entropy, information gain, and/or Gini impurity metrics, to determine the appropriate nodes and branching for the decision tree. For example, ID3 (Iterative Dichotomiser 3), C4.5, CART (Classification And Regression Tree), or similar algorithms may be utilized.

Figure 12:
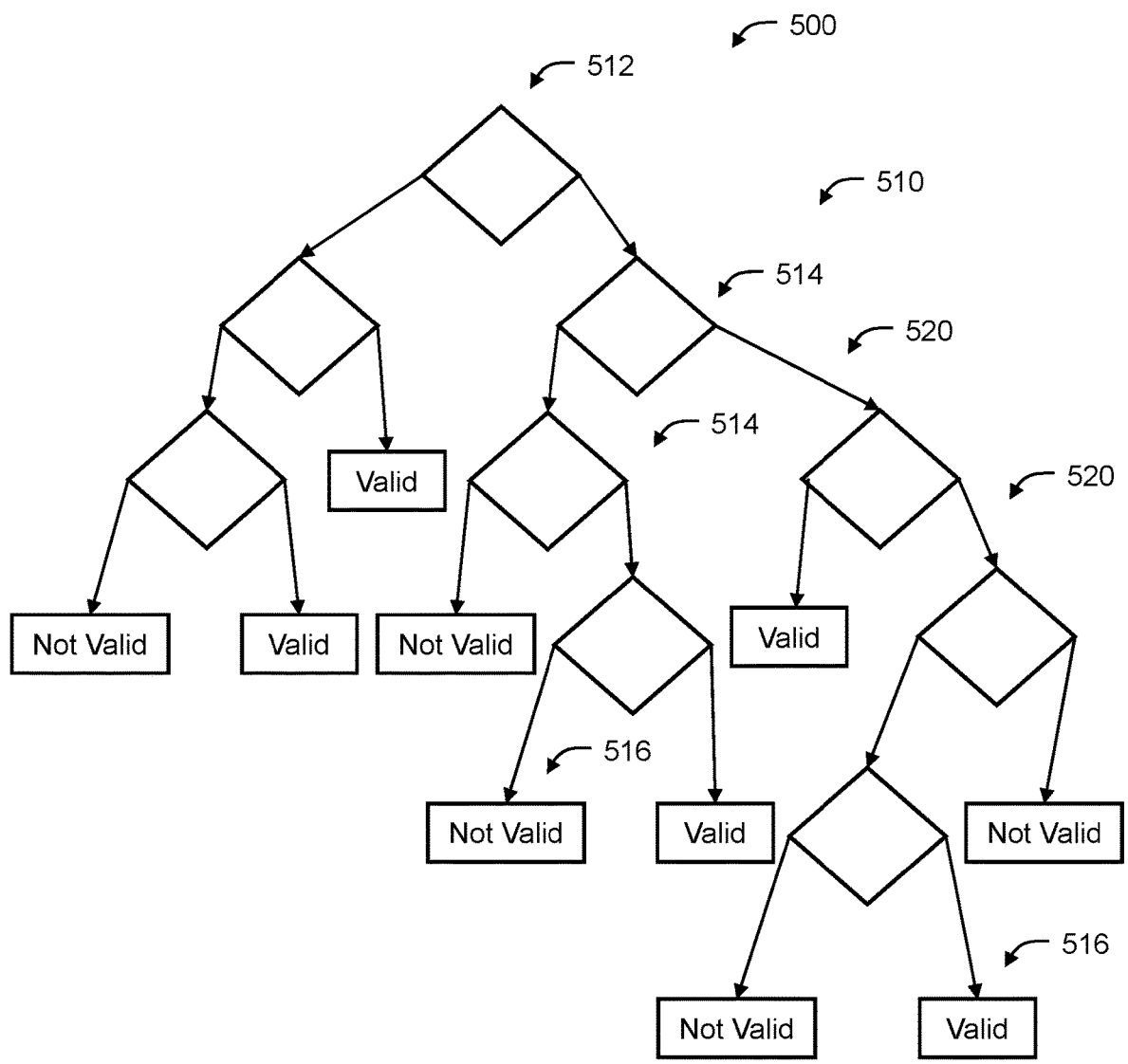
FIG. 12 is a diagram of an example decision tree, in accordance with an embodiment.

Referring now to FIG. 12, there is shown an example decision tree 500 that can be trained using training method 600 to determine whether a tire pressure value is erroneous (i.e., not valid) or valid. As shown, the decision tree 500 can have a hierarchical or tree-like structure made up of a plurality of nodes 510 and a plurality of branches 520 connecting the nodes 510. Each internal or decision node 514 can represent a decision or test on an attribute, each branch 520 can represent the outcome of that decision or test, and each end or leaf node 516 can represent a classification. As shown, each path from the root node 512 to a leaf node 514 can represent a classification rule. As described herein, the structure of the decision tree 500 (e.g., the attributes evaluated at each node) can be established by a suitable training algorithm (e.g., ID3, C4.5, CART, etc.) using suitable training data (e.g., tire pressure value samples 430 and time value samples 440).

Figure 13:
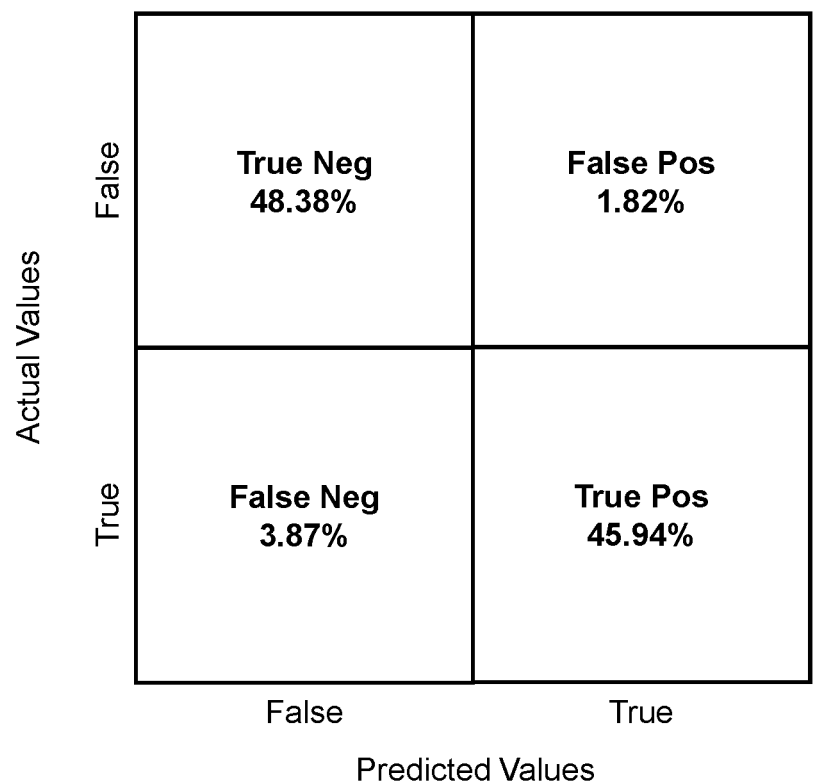
FIG. 13 is a confusion matrix of an example trained machine learning classifier, in accordance with an embodiment.

Referring now to FIG. 13, there is shown an example confusion matrix for a decision tree 500 trained using training method 600. As shown, the training method 600 can produce a tire pressure value classifier having almost 95% accuracy.

Figure 14:
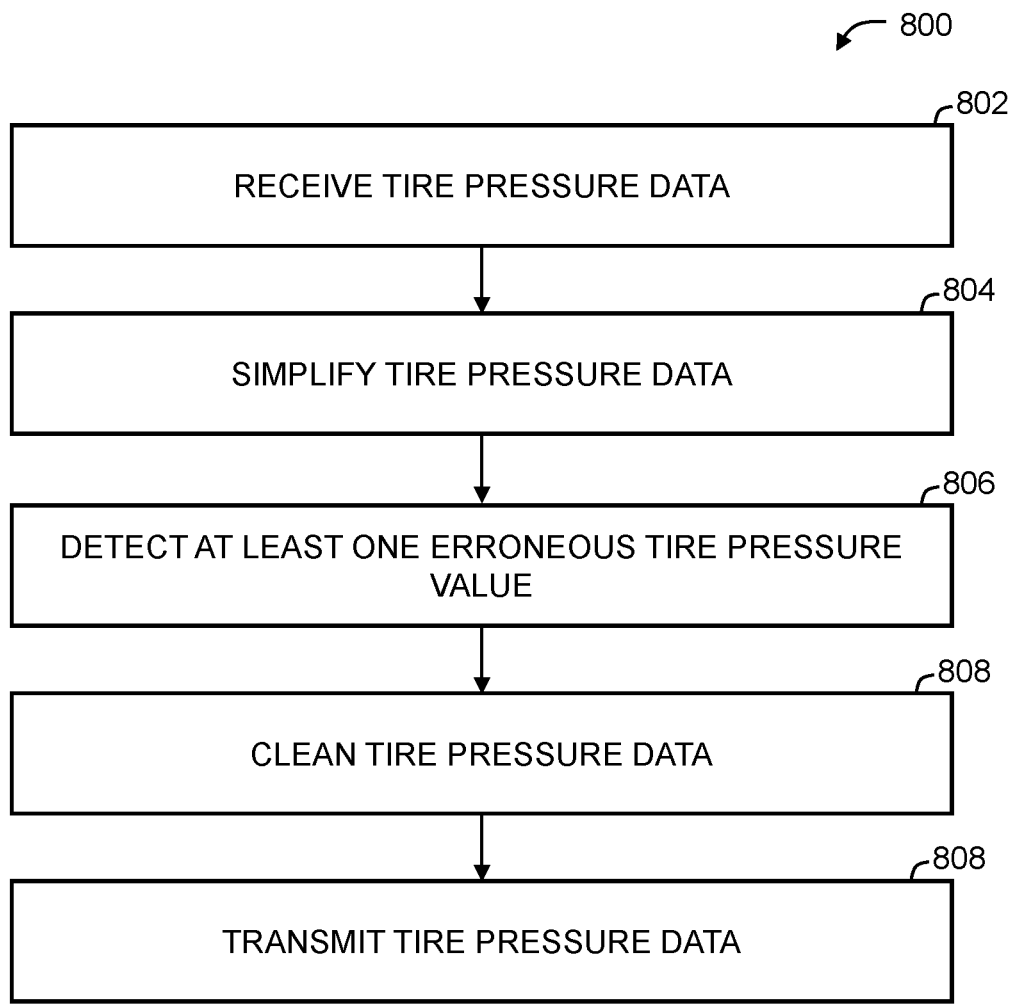
FIG. 14 is a flowchart of an example method for detecting and removing erroneous tire pressure values, in accordance with an embodiment.

Referring now to FIG. 14, there is shown an example method 800 for detecting and removing erroneous tire pressure values. Preferably, the erroneous value removal method 800 is implemented by a telematics device 130 (i.e., by at least one processor 132 executing instructions stored on at least one data store 134). An advantage of executing at least a portion of the erroneous value removal method 800 at a telematics device 130 is that less tire pressure data 410 is transmitted to the fleet management system 110. This may reduce bandwidth requirements for the network 140 and storage and processing requirements for the fleet management system 110 and/or computing devices 150. However, it should be appreciated that in some embodiments, the erroneous value removal method 800 may be executed, at least in part, by the fleet management system 110, one or more computing devices 150, or a combination thereof. That is, the erroneous value removal method 800 may be implemented by any of the one or more processors 112, 132, 152 executing instructions stored on any of the one or more data stores 114, 134, 154.

At 802, tire pressure data 410 can be received. The tire pressure data 410 can be received from a vehicle 120 by the telematics device 130. For example, the tire pressure data 410 can be collected by the telematics device 130 from a TPMS though one or more vehicle interfaces 124, such as an ODB-II port and/or CAN bus. The tire pressure data 410 can include a time series of tire pressure values. The time series can include a plurality of data points, with each data point representing a tire pressure value at a particular point in time. The tire pressure data 410 can include normal or valid tire pressure values 412, as well as erroneous tire pressure values 414.

At 804, the tire pressure data 410 can be simplified. The tire pressure data 410 can be simplified by removing at least some of the tire pressure values. Since the tire pressure data 410 may be sampled at a relatively high frequency, there may be tire pressure values that are unnecessary to provide an accurate representation of the tire pressure. For example, there may be many duplicate tire pressure values. These unnecessary tire pressure values can be removed to simplify the tire pressure data 410 to a fewer number of data points.

Preferably, the tire pressure data 410 can be simplified by removing at least some of the tire pressure values that satisfy a predetermined interpolation error threshold. The predetermined interpolation error threshold can represent a maximum distance between an original curve defined by the tire pressure values and a simplified curve defined by a subset of the tire pressure values. Determining the simplified curve can involve determining an interpolation error of removing the at least some of the tire pressure values based on a Ramer-Douglas-Peucker algorithm. This may involve recursively dividing the original curve into line segments, starting with the first and last data points, to determine the resulting interpolation error. The data points that exceed the predetermined interpolation error threshold can be used to generate further line segments and determine interpolation error until the remaining data points satisfy the predetermined interpolation error threshold.

At 806, at least one erroneous tire pressure value in the tire pressure data 410 can be detected. The at least one erroneous tire pressure value can be detected using a trained machine learning classifier. The trained machine learning classifier can be a machine learning classifier trained using the training method 600. For example, the machine learning classifier can be a binary classifier operable to classify a tire pressure value as valid or erroneous. Preferably, the machine learning classifier is a tree-based classifier. However, the machine learning classifier can generally include any suitable machine learning models and can be trained using any suitable method.

As described herein, the machine learning classifier can be trained using a plurality of tire pressure value samples 430. Each tire pressure value sample 430 can include a consecutive sequence of tire pressure values. The tire pressure value samples 430 can be collected from a plurality of different vehicle types (e.g., make, model, and/or year). The tire pressure value samples 430 can include erroneous tire pressure value samples and valid tire pressure value samples. The erroneous tire pressure value samples can include one or more erroneous tire pressure values. The valid tire pressure value samples can include a plurality of valid tire pressure values. The machine learning classifier can also be trained using a plurality of time value samples 440. Each time value sample 440 can include a consecutive sequence of relative time values associated with the consecutive sequence of tire pressure values.

The machine learning classifier can detect each erroneous tire pressure value based on the erroneous tire pressure value and a plurality of lagging tire pressure values consecutively trailing the erroneous tire pressure value. For example, similar to the tire pressure value samples 430 used to train the machine learning classifier, the erroneous tire pressure value can be a current tire pressure value 434 and the plurality of lagging tire pressure values can be a series of lagging tire pressure values 436.

The machine learning classifier can also detect the erroneous tire pressure values based on a plurality of relative time values associated with the erroneous tire pressure value and the plurality of lagging tire pressure values. For example, similar to the time value samples 430 used to train the machine learning classifier, the relative time values can include a current time value 444 and a series of lagging time values 446.

At 808, the tire pressure data 410 can be cleaned. The tire pressure data 410 can be cleaned by removing the at least one erroneous tire pressure value. That is, the at least one erroneous tire pressure value detected by the trained machine learning classifier can be removed from the tire pressure data 410.

At 810, the tire pressure data 410 can be transmitted to a fleet management system 110. The at least one erroneous tire pressure value is not transmitted to the fleet management system 110. As a result, the amount of tire pressure data 410 transmitted to the fleet management system 110, processed by the fleet management system 110, and stored by the fleet management system 110 can be reduced. This may reduce bandwidth requirements for the network and storage and processing requirements for the fleet management system 110. This may also improve the quality and accuracy of the tire pressure data 410.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device. Furthermore, the term "coupled" may indicate that two elements can be directly coupled to one another or coupled to one another through one or more intermediate elements.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Furthermore, any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). Programmable hardware such as FPGA can also be used as standalone or in combination with other devices. These devices may also have at least one input device (e.g., a pushbutton keyboard, mouse, a touchscreen, and the like), and at least one output device (e.g., a display screen, a printer, a wireless radio, and the like) depending on the nature of the device. The devices may also have at least one communication device (e.g., a network interface).

It should also be noted that there may be some elements that are used to implement at least part of one of the embodiments described herein that may be implemented via software that is written in a high-level computer programming language such as object-oriented programming. Accordingly, the program code may be written in C, C++ or any other suitable programming language and may comprise modules or classes, as is known to those skilled in object-oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

The invention claimed is:

1. A telematics device comprising:
at least one processor operable to:
receive, from a vehicle, tire pressure data comprising a time series of tire pressure values;
simplify the tire pressure data by removing at least some of the tire pressure values that satisfy a predetermined interpolation error threshold;
detect, using a trained machine learning classifier, at least one erroneous tire pressure value in the tire pressure data, each erroneous tire pressure value being detected based on one of the tire pressure values and a plurality of lagging tire pressure values consecutively trailing that tire pressure value;
clean the tire pressure data by removing the at least one erroneous tire pressure value; and
transmit the tire pressure data to a fleet management system, whereby the at least one erroneous tire pressure value is not transmitted to the fleet management system.

2. The telematics device of claim 1, wherein the machine learning classifier detects each erroneous tire pressure value further based on a plurality of relative time values associated with the erroneous tire pressure value and the plurality of lagging tire pressure values.

3. The telematics device of claim 1, wherein the machine learning classifier is trained using a plurality of tire pressure value samples, each tire pressure value sample comprising a consecutive sequence of tire pressure values.

4. The telematics device of claim 3, wherein the machine learning classifier is trained further using a plurality of time value samples, each time value sample comprising a consecutive sequence of relative time values associated with the consecutive sequence of tire pressure values.

5. The telematics device of claim 3, wherein the plurality of tire pressure value samples comprises a plurality of erroneous tire pressure value samples, each erroneous tire pressure value sample comprising one or more erroneous tire pressure values.

6. The telematics device of claim 5, wherein at least some of the plurality of erroneous tire pressure value samples comprises one or more valid tire pressure values.

7. The telematics device of claim 5, wherein:
the plurality of tire pressure value samples comprises a plurality of valid tire pressure value samples, the plurality of valid tire pressure value samples comprising a plurality of valid tire pressure values.

8. The telematics device of claim 3, wherein the plurality of tire pressure value samples is collected from a plurality of different vehicle types.

9. The telematics device of claim 1, wherein the machine learning classifier is a binary classifier operable to classify a tire pressure value as valid or erroneous.

10. The telematics device of claim 1, wherein the machine learning classifier is a tree-based classifier.

11. A method for detecting and removing erroneous tire pressure values, the method comprising operating at least one processor of a telematics device to:
receive, from a vehicle, tire pressure data comprising a time series of tire pressure values;
simplify the tire pressure data by removing at least some of the tire pressure values that satisfy a predetermined interpolation error threshold;
detect, using a trained machine learning classifier, at least one erroneous tire pressure value in the tire pressure data, each erroneous tire pressure value being detected based on one of the tire pressure values and a plurality of lagging tire pressure values consecutively trailing that tire pressure value;
clean the tire pressure data by removing the at least one erroneous tire pressure value; and
transmit the tire pressure data to a fleet management system, whereby the at least one erroneous tire pressure value is not transmitted to the fleet management system.

12. The method of claim 11, wherein the machine learning classifier detects each erroneous tire pressure value further based on a plurality of relative time values associated with the erroneous tire pressure value and the plurality of lagging tire pressure values.

13. The method of claim 11, wherein the machine learning classifier is trained using a plurality of tire pressure value samples, each tire pressure value sample comprising a consecutive sequence of tire pressure values.

14. The method of claim 13, wherein the machine learning classifier is trained further using a plurality of time value samples, each time value sample comprising a consecutive sequence of relative time values associated with the consecutive sequence of tire pressure values.

15. The method of claim 13, wherein the plurality of tire pressure value samples comprises a plurality of erroneous tire pressure value samples, each erroneous tire pressure value sample comprising one or more erroneous tire pressure values.

16. The method of claim 15, wherein at least some of the plurality of erroneous tire pressure value samples comprises one or more valid tire pressure values.

17. The method of claim 15, wherein:
the plurality of tire pressure value samples comprises a plurality of valid tire pressure value samples, the plurality of valid tire pressure value samples comprising a plurality of valid tire pressure values.

18. The method of claim 13, wherein the plurality of tire pressure value samples is collected from a plurality of different vehicle types.

19. The method of claim 11, wherein the machine learning classifier is a binary classifier operable to classify a tire pressure value as valid or erroneous.

20. The method of claim 11, wherein the machine learning classifier is a tree-based classifier.

21. A non-transitory computer readable medium having instructions stored thereon executable by at least one processor to implement a method for detecting and removing erroneous tire pressure values, the method comprising operating the least one processor to:
receive, from a vehicle, tire pressure data comprising a time series of tire pressure values;
simplify the tire pressure data by removing at least some of the tire pressure values that satisfy a predetermined interpolation error threshold;
detect, using a trained machine learning classifier, at least one erroneous tire pressure value in the tire pressure data, each erroneous tire pressure value being detected based on one of the tire pressure values and a plurality of lagging tire pressure values consecutively trailing that tire pressure value;
clean the tire pressure data by removing the at least one erroneous tire pressure value; and
transmit the tire pressure data to a fleet management system, whereby the at least one erroneous tire pressure value is not transmitted to the fleet management system.

* * * * *